(12) United States Patent
Iizuka

(10) Patent No.: US 6,400,486 B1
(45) Date of Patent: Jun. 4, 2002

(54) SCANNING OPTICAL SYSTEM HAVING DIFFRACTIVE LENS SURFACE

(75) Inventor: Takashi Iizuka, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/652,006

(22) Filed: Aug. 31, 2000

(30) Foreign Application Priority Data

Sep. 2, 1999 (JP) .......................................... 11-248464

(51) Int. Cl.⁷ .............................................. G02B 26/08
(52) U.S. Cl. ........................ 359/205; 359/212; 359/216
(58) Field of Search ................................ 359/205–207, 359/216–219, 569–571, 738–740

(56) References Cited

U.S. PATENT DOCUMENTS 5,838,480 A 11/1998 McIntyre et al.
6,124,962 A  9/2000 Kamikubo

FOREIGN PATENT DOCUMENTS

EP  0827004   3/1998
JP  10-68903   3/1998
JP  10197820   7/1998

*Primary Examiner*—James Phan
(74) *Attorney, Agent, or Firm*—Greenblum & Bernstein, P.L.C.

(57) ABSTRACT

A scanning optical system is provided with a laser diode, a polygonal mirror and a scanning lens system. The scanning lens system has positive power. Further, the scanning lens system has a plurality of lens surfaces, one of which is formed with a diffractive lens structure for compensating for aberration in a main scanning direction caused by characteristics of a refractive lens structure of the scanning optical system. The diffractive lens structure is arranged such that an axis that connects a front focal point and a rear focal point of the diffractive lens structure is shifted in an auxiliary scanning direction with respect to an optical axis of the refractive lens structure of the scanning lens system.

8 Claims, 8 Drawing Sheets

SCANNING OPTICAL SYSTEM HAVING DIFFRACTIVE LENS SURFACE

BACKGROUND OF THE INVENTION

The present invention relates to a scanning optical system used in, for example, scanning optical apparatuses such as a laser beam printer, and more particularly to a scanning optical system employing a diffractive lens surface for compensating for aberrations of refraction lenses.

Conventionally, a scanning optical system including a diffraction lens structure has been known. Examples of such a scanning optical system are disclosed, for example, in Japanese Patent Provisional Publications No. HEI 10-197820 and No. HEI 10-68903. Each of the scanning optical systems disclosed in the publications is provided with a laser source, a polygonal mirror for deflecting the laser beam emitted by the laser source, an fθ lens for converging the deflected beam onto an objective surface to be scanned, such as a surface of a photoconductive drum. On one surface of the lenses included in the fθ lens, a diffractive lens structure is formed.

The diffractive lens structure disclosed in Japanese Patent Provisional Publications No. HEI 10-197820 is formed with a rotationally symmetrical pattern having a plurality of concentric annular zones for compensating lateral chromatic aberration due to dispersion of the fθ lens serving as a refractive lens. The diffractive lens structure disclosed in Japanese Patent Provisional Publications No. HEI 10-68903 is formed with a similar pattern for compensating shift of magnification and focal point of a plastic lens due to variation of temperature.

In the conventional scanning optical system including the diffractive lens structure, an axis connecting a front focal point and a rear focal point of the diffractive lens structure substantially coincides with the optical axis of the refractive lens structure of the fθ lens. Therefore, if unnecessary components of diffracted light are generated by the diffractive lens structure, they become distributed with respect to a necessary component of the diffracted light at certain angles in a main scanning direction. It should be noted that in this specification, the term "main scanning direction" is defined as a direction of movement of a beam spot on an objective surface, which is to be scanned, due to rotation of the polygonal mirror, and a term "auxiliary scanning directions" is defined as a direction perpendicular to the main scanning direction on the objective surface. In the above case, therefore, beam spots formed by the unnecessary components and a beam spot formed by the necessary component are formed on the same scanning line, which extends in the main scanning direction. If an image is formed with this condition, quality of the image is deteriorated due to the unnecessary components.

For example, if a diffractive lens structure is designed such that a first order diffraction beam is used for imaging, and a second order diffraction beam and a zero-th order beam are present as unnecessary beams, beam spots formed by the second order and zero-th order beams are located spaced from, in the main scanning direction, a beam spot formed by the first order diffraction beam. Although the spots formed by the unnecessary order diffraction beams are not focused on the objective surface in the main scanning direction, they are focused in the auxiliary scanning direction. Therefore, the energy applied to a unit area is not negligible.

Further, modulation (i.e., turning ON/OFF) of the light source is controlled in accordance with a scanning position of the first order beam, and when the light source is turned ON/OFF, the unnecessary components are also turned ON/OFF. If the zero-th and/or second order diffraction light beam is located at a portion which should not be exposed to light, and the first order diffraction light beam is located at a position which is to be exposed to the light, since the zero-th and second order light beams strike the portion which should not be exposed to light that corresponds to anon-printed portion on a sheet, for example, a plurality of black dots may be printed on the portion.

Further, according to the conventional diffraction lens structure, the unnecessary diffraction components and the necessary diffraction component are incident on a point on the objective surface at different timing. However, since all the components proceeds to the point along substantially the same optical path, it is difficult to spatially eliminate only the unnecessary components.

SUMMARY OF THE INVENTION

It is therefore an object of the invention to provide an improved scanning optical system employing a diffractive lens structure for compensating aberrations of refractive lens structure, which is capable of spatially splitting unnecessary diffraction beams from a necessary diffraction beam.

For the above object, according to the present invention, there is provided a scanning optical system, which is provided with a light source that emits a light beam, a deflector that deflects the light beam emitted by the light source to scan, in a main scanning direction, within a predetermined angular range, and a scanning lens system that converges the light beam deflected by the deflector on a surface to be scanned. The scanning lens system has positive power. Further, the scanning lens system has a plurality of lens surfaces, and a diffractive lens structure is formed on at least one of the plurality of lens surfaces. The diffractive lens structure compensates for aberration in the main scanning direction caused by characteristics of a refractive lens structure of the scanning optical system. The diffractive lens structure is arranged such that an axis connecting a front focal point and a rear focal point of the diffractive lens structure is shifted, in an auxiliary scanning direction, with respect to an optical axis of the refractive lens structure of the scanning lens system.

With this structure, diffraction light components are spatially separated in the auxiliary scanning direction. Therefore, it becomes possible to selectively shield or allow a component to proceed.

Optionally, the diffractive lens structure may be formed as a part of a rotationally symmetrical pattern including a plurality of concentric annular zones.

Preferably, the diffractive lens structure is formed on a planar lens surface. Then, a mold of the diffractive lens can be manufactured easily.

Further optionally, the scanning optical system may include a light shielding member for shielding predetermined diffractive light components, the light shielding member being located between a lens provided with the diffractive lens structure and the surface to be scanned.

With this light shielding member, unnecessary diffraction light components can be shielded.

Still optionally, the scanning optical system may be provided with a prismatic diffractive lens structure for compensating for shift of a scanning line, on the surface to be scanned, in the auxiliary scanning direction due to variation of wavelength of the beam.

In a particular case, the prismatic diffractive lens structure may be provided between the light source and the deflector. Alternatively, the prismatic diffractive lens structure may be provided between the deflector and the surface to be scanned.

BRIEF DESCRIPTION OF THE ACCOMPANYING DRAWINGS

DESCRIPTION OF THE EMBODIMENTS

Figure 1:
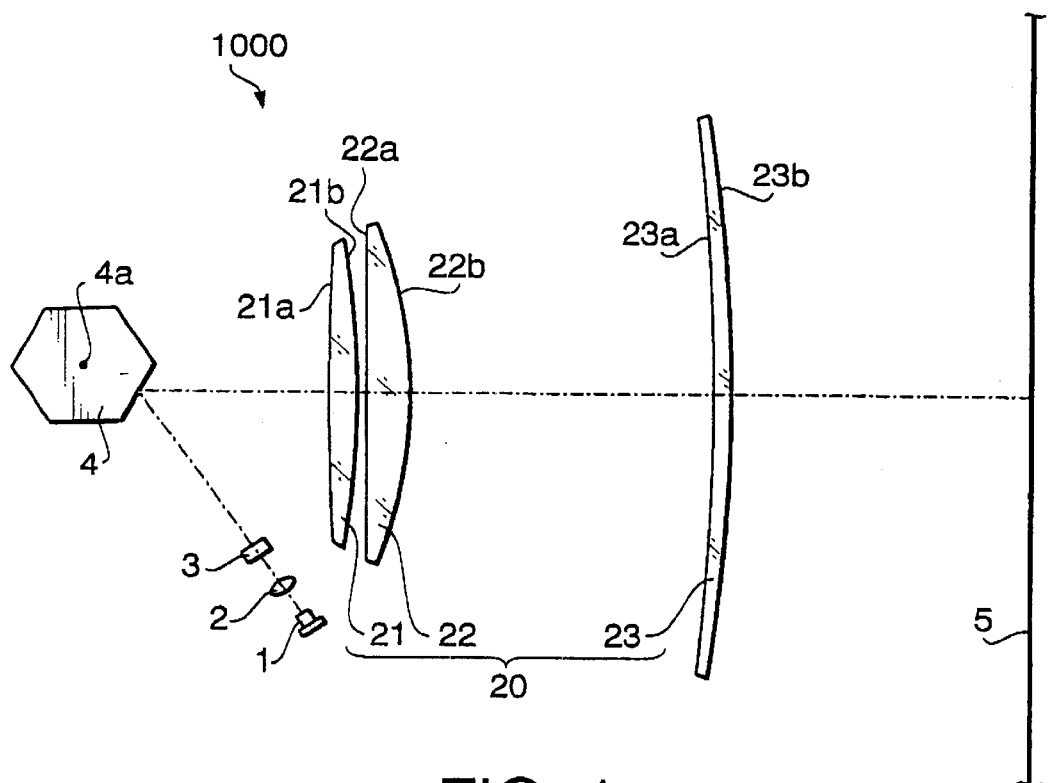
FIG. 1 is a plan view schematically showing an arrangement of optical elements of a scanning optical system according to the a first embodiment of the invention.
Figure 2:
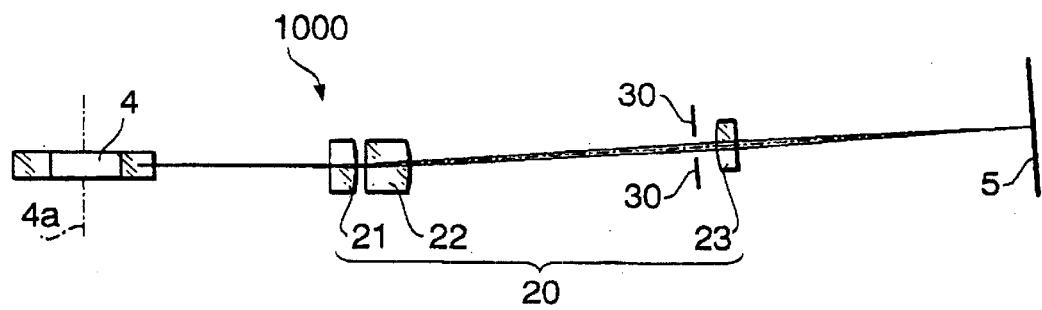
FIG. 2 is a side view of the scanning optical system shown in FIG. 1.
Figure 3:
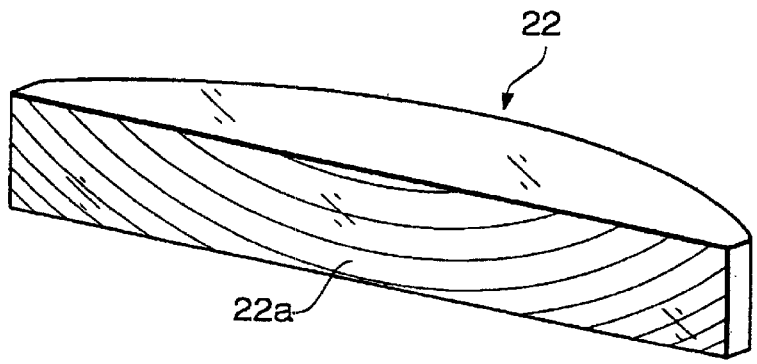
FIG. 3 is a perspective view of a lens, on which a diffractive lens structure is formed, included in an fθ lens of the scanning optical system.
Figure 4:
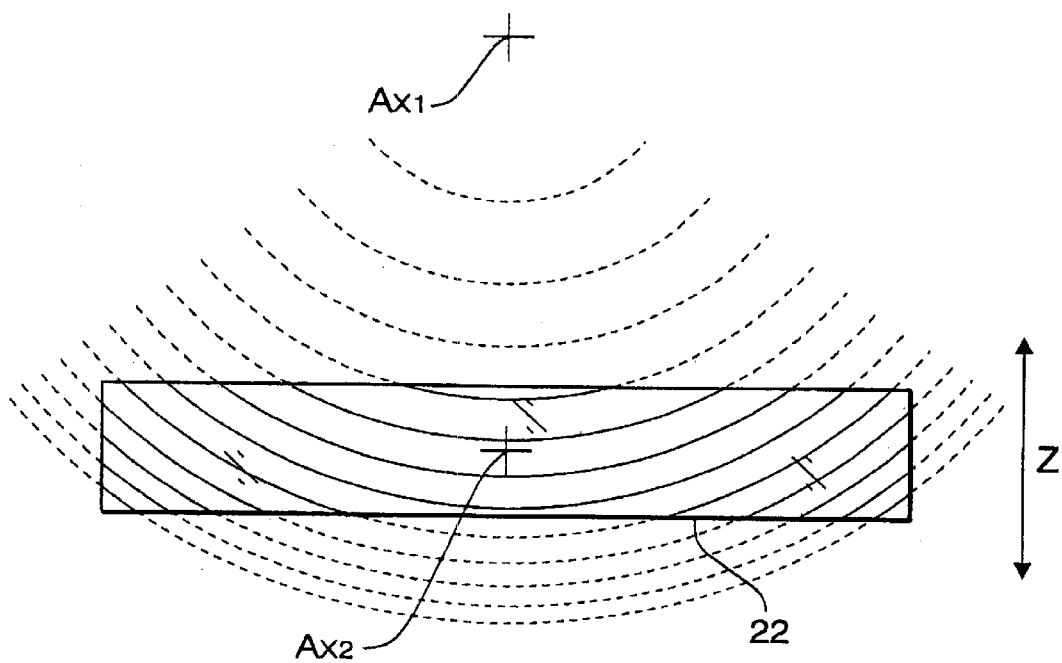
FIG. 4 shows a lens, viewed from the front, on which the diffractive lens structure is formed.
Figure 5:
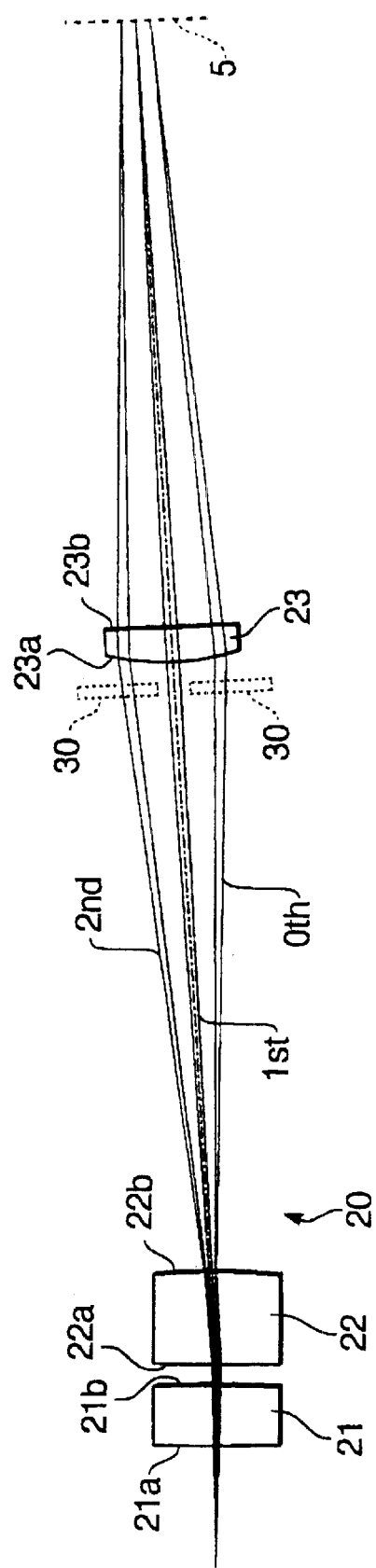
FIG. 5 shows optical paths of diffraction components, i.e., zero-th, first and second order components of light diffracted by the diffractive lens structure.

Hereinafter, embodiments of the present invention will be described with reference to the accompanying drawings.
First Embodiment FIGS. 1–5 show a scanning optical system according to a first embodiment of the invention. FIG. 1 is a plan view of the optical elements of the scanning optical system 1000 according to the first embodiment of the invention. FIG. 2 is a side view of the scanning optical system 1000. FIG. 3 schematically shows a perspective view of a lens 22 on which a diffractive lens structure is formed. FIG. 4 shows the lens 22, viewed along the optical axis thereof, on which the diffractive lens structure is formed. FIG. 5 shows optical paths of zero-th, first and second order light components.

A laser beam emitted by a light source (e.g., a laser diode) 1 is collimated by a collimating lens 2, then the beam is incident on a cylindrical lens 3. The beam passed through the cylindrical lens 3 is incident on a polygonal mirror 4, which is rotated about an axis 4$a$, and the beam is deflected thereby. The deflected laser beam passes through an fθ lens 20, which consists of three lens elements, and is converged on an objective surface 5 to be scanned such that a beam spot is formed thereon. The moving direction of the beam spot on the objective surface 5 is defined as a main scanning direction. Further, a direction perpendicular to the main scanning direction on the objective surface 5 is defined as an auxiliary scanning direction.

The cylindrical lens 3 has positive power in a direction parallel to the auxiliary scanning direction, and converges the light emitted from the light source 1 to form a line image on a plane closely adjacent to a mirror surface (i.e., a side surface) of the polygonal mirror 4. The beam is deflected by the polygonal mirror 4 which is rotating about the axis 4$a$, and scans within a predetermined angular range. The fθ lens 20 converges the deflected light on the objective surface 5 to form a substantially circular beam spot, which moves along a line (i.e., a scanning line) extending in the main scanning direction at a constant speed. In the above structure, the mirror surface of the polygonal mirror 4 and the objective surface 5 are substantially conjugate. With this configuration, facet error of the mirror surfaces of the polygonal mirror 4 is compensated.

The fθ lens 20 consists of from the polygonal mirror side to the objective surface side, a first lens 21 having positive power in the main and auxiliary scanning directions, a second lens 22 having positive power in the main and auxiliary scanning directions, and a third lens 23 having positive power substantially only in the auxiliary scanning direction. The first lens is a convex lens, the second lens 22 is a plano-convex lens, and the third lens 23 is a lens elongated in the main scanning direction. The first lens 21 and the second lens 22 are arranged relatively closer to the polygonal mirror 4, and the third lens 23 is arranged at a position relatively closer to the objective surface 5.

A polygonal mirror side surface 21$a$ of the first lens 21 is a rotationally symmetrical aspherical surface, and the opposite surface 21$b$ is a spherical surface. A polygonal mirror side surface 22$a$ of the second lens 22 is a diffractive lens surface. The diffractive lens surface is formed such that a diffractive lens structure is formed on a base curve, which is, in the embodiment, a planar (flat) surface. The diffractive lens 22$a$ compensates for lateral chromatic aberration of refractive lenses. The opposite surface 22$b$ of the second lens is a convex spherical surface. A polygonal lens side surface 23$a$ of the third lens 23 is a toric surface, and the opposite surface 23$b$ is a convex spherical surface.

The diffractive lens structure formed on the surface 22$a$ of the second lens 22 functions to compensate for the lateral chromatic aberration in the main scanning direction. The lateral chromatic aberration is caused due to characteristics of the refractive lens structure of the fθ lens 20. It is preferable that the surface, on which the diffractive lens structure, is formed is closer to the polygonal mirror 4, and is rotationally symmetrical. At a lens surface relatively close to the polygonal mirror 4, the diameter of the cross-section of the beam passing through the lens is relatively large, and therefore, when the light beam passes through the diffractive lens structure, it is not affected by loss of light amount caused by the stepped portions of the diffractive lens structure. Further, when a mold of each lens is formed, it is preferable that the base curve is rotationally symmetrical in view of facility in forming the mold. In particular, if the base curve is a planar surface, the molding process is performed easily.

The diffractive lens structure is formed as a portion of rotationally symmetrical pattern including a plurality of concentric annular zones as illustrated in FIG. 4. An axis Ax1 connecting the front and rear focal points of the diffractive lens is shifted in the auxiliary scanning direction (Z direction) with respect to the optical axis Ax2 of the refractive lens structure of the fθ lens 20. With this structure, diffraction light components emerge from the diffraction lens structure at different angles in the auxiliary scanning direction as shown in FIG. 5. Thus, with this configuration, the unnecessary diffraction components (i.e., zero-th and second order components) can be spatially separated from a necessary diffractive light component (i.e., a first order component), in the auxiliary scanning direction.

On the polygonal mirror side of the third lens 23, light shielding plates 30, which extend in the main scanning direction, are arranged as shown in FIG. 2 so as to shield the unnecessary diffraction components. The first order light component travels at an area where the light shielding plates are not provided, while the zero-th order component and the first order component are shielded by the lower and upper light shielding plates 30 as illustrated in FIG. 5, respectively. It should be noted that FIG. 5 shows a case where the light shielding plates 30 are removed (which are indicated by broken lines), and the unnecessary components are incident on the objective surface 5. By placing the light shielding plates 30 in position, the unnecessary diffraction components can be shielded.

TABLE I below indicates a numerical structure of the scanning optical system according to the first embodiment, for the elements on the objective surface side with respect to the cylindrical lens 3. In TABLE I, K denotes a scanning coefficient, ry denotes a radius of curvature in the main scanning direction, rz denotes a radius of curvature in the auxiliary scanning direction (which is omitted when the surface is spherical), d denotes a distance between adjacent surfaces along the optical axis, n770, n780 and n790 denote refractive indexes at wavelengths 770 nm, 780 nm and 790 nm, respectively.

In TABLE I, surfaces #1 and #2 are those of the cylindrical lens 3, a surface #3 is a mirror surface of the polygonal mirror 4, surfaces #4 and #5 are those of the first lens 21, surfaces #6 and #7 are those of the second lens 22, and surfaces #8 and #9 are those of the third lens 23.

TABLE I

K-180 scanning width: 216 mm design wavelength: 780 nm

| surface | ry | rz | d | n770 | n780 | n790 |
|---|---|---|---|---|---|---|
| #1 | inf. | 40.000 | 4.00 | 1.51093 | 1.51072 | 1.51052 |
| #2 | inf. | 57.80 | | | | |
| #3 | inf. | — | 55.00 | | | |
| #4 | 1000.000 | — | 8.35 | 1.48636 | 1.48617 | 1.48598 |
| #5 | −266.384 | — | 2.00 | | | |
| #6 | inf. | — | 12.53 | 1.48636 | 1.48617 | 1.48598 |
| #7 | −153.503 | — | 86.68 | | | |
| #8 | −700.000 | 28.850 | 5.00 | 1.48636 | 1.48617 | 1.48598 |
| #9 | −670.000 | — | 85.44 | | | |

The first surface 21a (i.e., #4) of the first lens 21, which is a rotationally symmetrical aspherical surface, is expressed by the following formula:

$$X(Y) = \frac{CY^2}{1+\sqrt{1-(1+\kappa)C^2Y^2}} + A4Y^4 + A6Y^6 + A8Y^8$$

where, X(Y) is a sag amount, which represents a distance of a point on the spherical surface from a plane tangent, at the optical axis, to the aspherical surface at height Y from the optical axis, C represents a curvature (i.e., 1/r) of the aspherical surface on the optical axis, κ is a conical coefficient, and A4, A6, A8 are aspherical coefficients of 4th, 6th, and 8th order.

The values of the conical coefficient κ and the aspherical coefficients A4, A6 and A8 are indicated in TABLE II.

TABLE II

| surface | k | A4 | A6 | A8 |
|---|---|---|---|---|
| #4 | 0.4359 | −1.05000 × 10$^{-7}$ | 1.53885 × 10$^{-11}$ | −1.22494 × 10$^{-15}$ |

It is known that, for a diffractive lens, a value corresponding to Abbe number of a refractive lens is −3.453. In this specification, this value for the diffractive lens is also referred to as Abbe number of a diffractive lens. Since the Abbe number of a diffractive lens is negative and the absolute value thereof is relatively large, by combining a diffractive lens having a relatively small power and a positive refractive lens, chromatic aberration of the refractive lens can be compensated.

The focal length of the diffractive lens structure according to the first embodiment is 6089.75 mm at wavelength 780 nm. The axis of the diffractive lens structure is shifted with respect to the optical axis of the refractive lens structure of the fθ lens by 400 mm.

Figure 6:
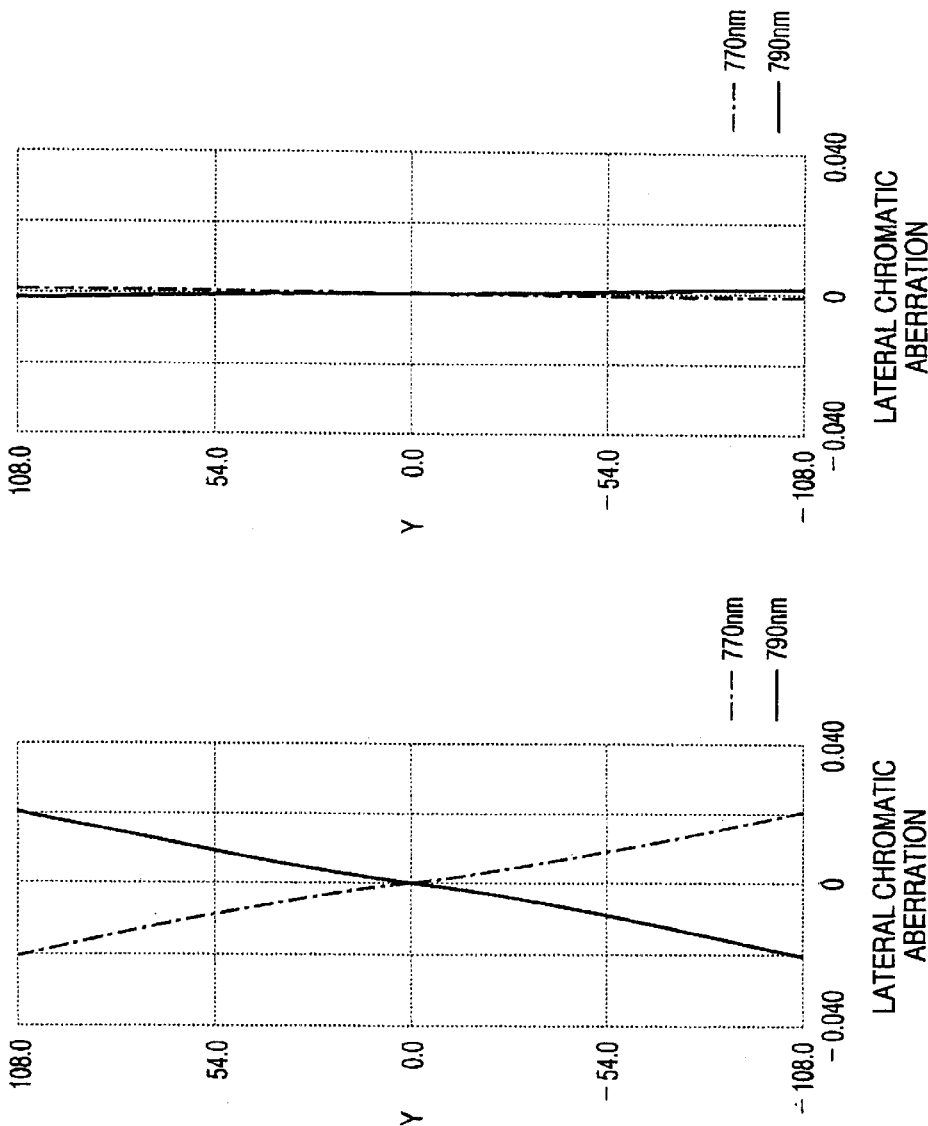
FIGS. 6A and 6B show lateral chromatic aberrations of scanning optical systems with/without diffractive lens structure.

FIG. 6A shows the lateral chromatic aberration. Specifically, FIG. 6A shows shift of scanning positions, in the main scanning direction, of the beams having wavelengths of 770 nm and 790 nm with respect to the scanning positions of the beam having wavelength of 780 nm, when the configuration of the scanning system is similar to that of the first embodiment except that the diffraction lens structure is not provided. FIG. 6B shows the lateral chromatic aberration of the scanning optical system according to the first embodiment of the invention. It is apparent from FIGS. 6A and 6B that, by the diffractive lens structure, the lateral chromatic aberration is well corrected. Therefore, by forming the diffractive lens structure, if the scanning device includes a plurality of light sources, and the wavelengths of the light sources of scanning optical system are distributed within a certain range, variation of the image forming performance among the scanning optical systems can be suppressed. Further, if the wavelength of the beam emitted by a single light source varies with time, change of the scanning position due to the change of the wavelength can be suppressed by the diffractive lens structure.

It should be noted that when the diffractive lens having a rotationally symmetrical pattern including a plurality of concentric annular zones is shifted with respect to the optical axis of the fθ lens, as in the first embodiment, the position of a scanning line formed on the objective surface 5 may vary, in the auxiliary scanning direction, depending on the variation of the wavelength of the beam. In order to compensate for such a shift of the scanning position, a prismatic diffraction lens structure having a prism effect is provided. The prismatic diffractive lens structure includes a plurality of line patterns extending in the main scanning direction. In the first embodiment, the prismatic diffractive lens structure is formed on a polygonal mirror side surface of the cylindrical lens 3 located between the light source 1 and the polygonal mirror 4.

Figure 7:
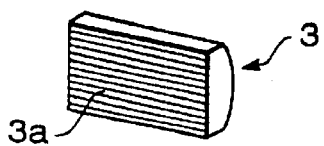
FIG. 7 is a perspective view of a cylindrical lens on which a prismatic diffractive lens structure is formed.

FIG. 7 is a perspective view of the cylindrical lens 3 formed with the prismatic diffractive lens structure 3a. In the first embodiment, the prismatic diffractive lens structure 3a is designed such that a pitch of the line patterns is 0.01976 mm. With this structure, shift of the scanning line in the auxiliary scanning direction caused by the diffractive lens structure 22a is compensated.

Second Embodiment

Figure 8:
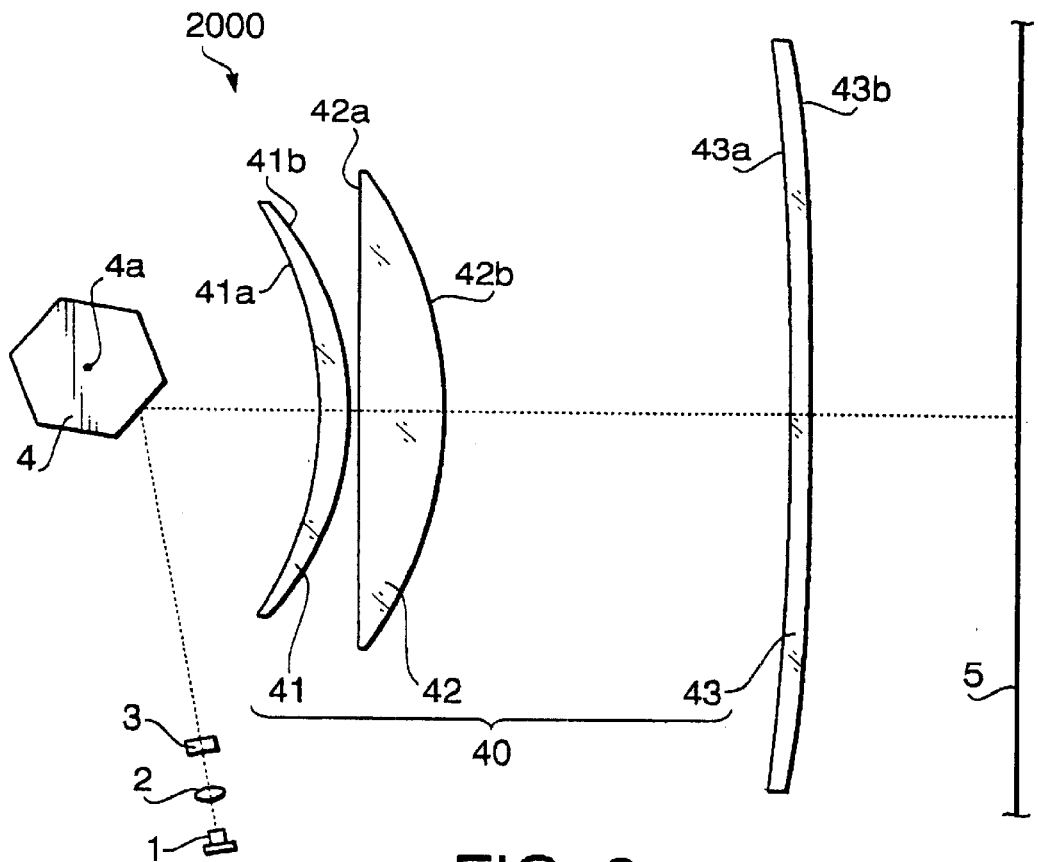
FIG. 8 is a plan view schematically showing an arrangement of optical elements of a scanning optical system according to the a second embodiment of the invention.
Figure 9:
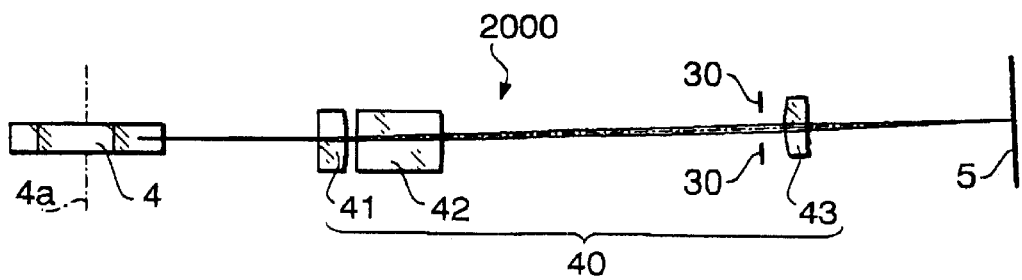
FIG. 9 is a side view of the scanning optical system shown in FIG. 8.
Figure 10:
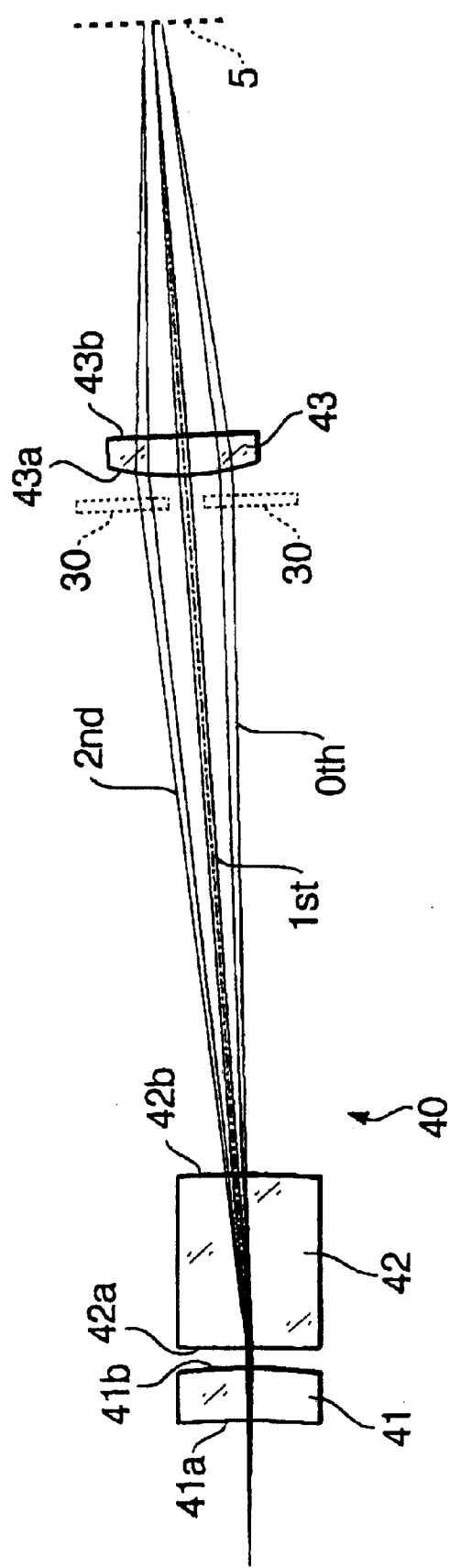
FIG. 10 shows optical paths of diffraction components, i.e., zero-th, first and second order components of light diffracted by the diffractive lens structure.

FIGS. 8–10 show a scanning optical system 2000 according to a second embodiment of the invention. FIG. 8 is a plan view showing an arrangement of optical elements of the scanning optical system 2000. FIG. 9 is a side view of the scanning optical system 2000. FIG. 10 shows optical paths of zero-th, first and second order diffraction light components in the second embodiment. A structure of the scanning optical system 2000, from the light source 1 to the polygonal mirror 4, is similar to that of the first embodiment.

In the scanning optical system 2000, an fθ lens 40 is provided. The fθ lens 40 includes, from the polygonal mirror side to the surface 5 side, first through third lenses 41, 42 and 43. The first lens 41 is a meniscus lens having positive power both in the main and auxiliary scanning directions. The second lens 42 is a plano-convex lens having positive power both in the main and auxiliary scanning directions. The third lens 43 is a lens elongated in the main scanning direction and having positive power substantially in the auxiliary scanning direction.

The polygonal mirror 4 side surface 41a of the first lens 41 is a rotationally symmetrical aspherical surface, and the opposite side surface 41b is a spherical surface. The polygonal mirror 4 side surface 42a of the second lens 42 is a diffractive lens surface, which has a Fresnel lens like diffractive lens structure for compensating lateral chromatic aberration of the refractive lens structure formed on a base curve, which is, in this embodiment, a planar surface. The opposite side surface 42b of the second lens 42 is a convex spherical surface. The polygonal mirror side surface 43a of the third lens 43 is a toric surface, and the opposite surface 34b is a convex spherical surface.

The diffractive lens structure is, similar to the first embodiment, defined as a part of rotationally symmetrical surface having a plurality of concentric annular zones. An axis connecting the front and rear focal points of the diffractive lens structure is shifted in the auxiliary scanning direction with respect to the optical axis of the fθ lens 40. Due to this structure, diffraction components proceed at different angular directions in the auxiliary scanning direction. With this configuration, unnecessary components (i.e., zero-th order and second order diffraction components) are spatially separated from a necessary light beam (i.e., the first order diffraction component).

TABLE III below indicates a numerical structure of the scanning optical system, on the surface 5 side with respect to the cylindrical lens 3.

TABLE III

K = 180 scanning width: 216 mm design wavelength: 780 nm

| surface | ry | rz | d | n770 | n780 | n790 |
|---|---|---|---|---|---|---|
| #1 | inf. | 51.080 | 4.00 | 1.51093 | 1.51072 | 1.51052 |
| #2 | inf. | — | 95.00 | | | |
| #3 | inf. | — | 45.00 | | | |
| #4 | −125.400 | — | 6.50 | 1.48636 | 1.48617 | 1.48598 |
| #5 | −94.000 | — | 3.00 | | | |
| #6 | inf. | — | 21.50 | 1.63594 | 1.63552 | 1.63512 |
| #7 | −120.365 | — | 87.90 | | | |
| #8 | −1000.000 | 21.500 | 5.00 | 1.48636 | 1.48617 | 1.48598 |
| #9 | −1124.192 | — | 52.00 | | | |

The first surface 41a of the first lens 41 is an aspherical surface, and the conical coefficient K, and the aspherical coefficients of 4th, 6th, and 8th order terms A4, A6 and A8 are indicated in TABLE IV.

TABLE IV

| surface | k | A4 | A6 | A8 |
|---|---|---|---|---|
| #4 | 3.1040 | −1.47000 × $10^{-7}$ | 2.70000 × $10^{-11}$ | 7.50000 × $10^{-15}$ |

The focal length of the diffractive lens structure according to the second embodiment is 3012.825 mm at wavelength of 780 nm. The axis of the diffractive lens structure is shifted with respect to the optical axis of the refractive lens structure of the fθ lens 40 by 150 mm.

Figure 11:
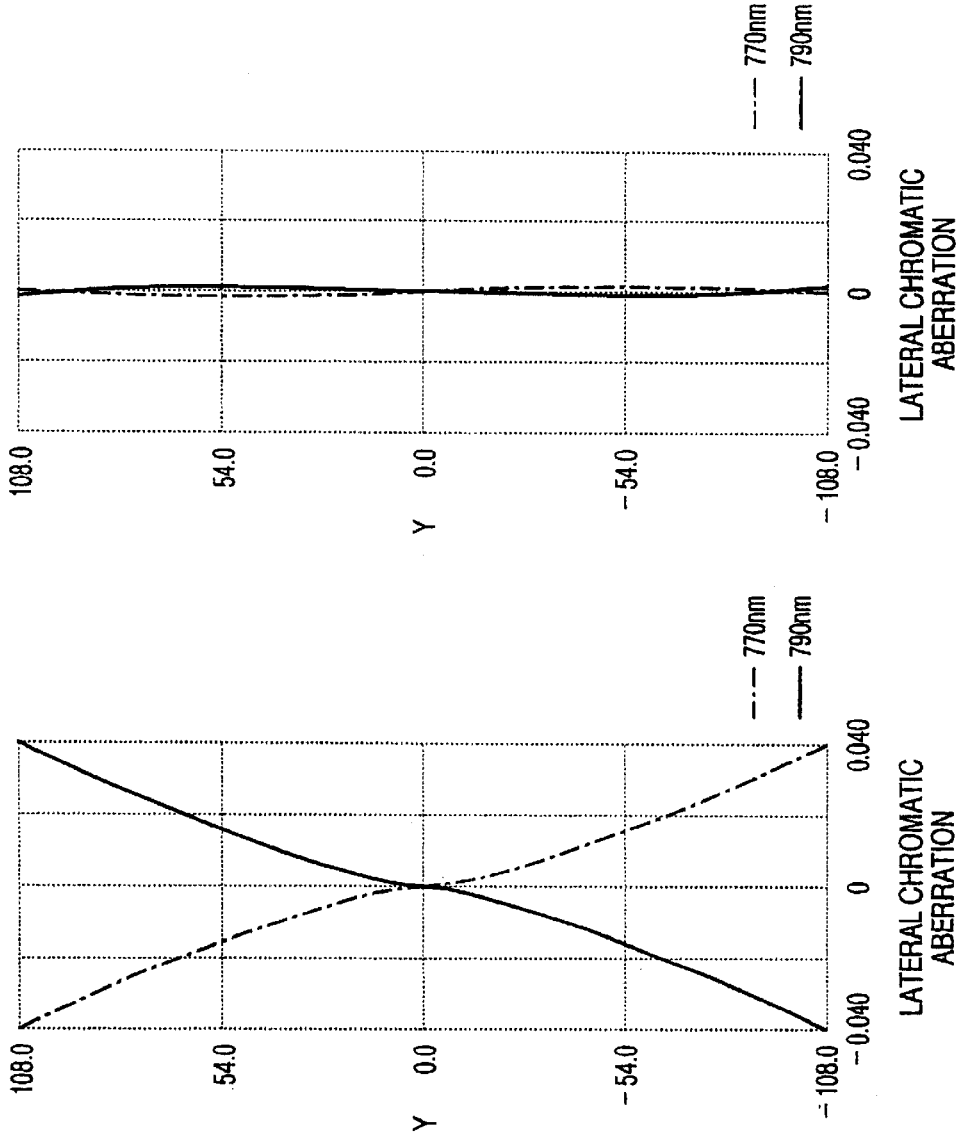
FIGS. 11A and 11B show lateral chromatic aberrations of scanning optical systems with/without diffractive lens structure.

FIG. 11A shows the lateral chromatic aberration, when the configuration of the scanning system is similar to that of the second embodiment except that the diffraction lens structure is not provided. FIG. 11B shows the lateral chromatic aberration of the scanning optical system according to the second embodiment of the invention. It is apparent from FIGS. 11A and 11B that, by the diffractive lens structure, the lateral chromatic aberration is well corrected. Therefore, by forming the diffractive lens structure, even if the wavelengths of the light sources of scanning optical systems are distributed within a certain range, variation of the image forming performance among the scanning optical systems can be suppressed.

In the second embodiment, the prismatic diffractive lens structure for compensating shift of the position of the scanning line in the auxiliary scanning direction is formed on the objective surface 5 side lens surface 43b of the third lens 43 located between the polygonal mirror 4 and the surface 5.

Figure 12:
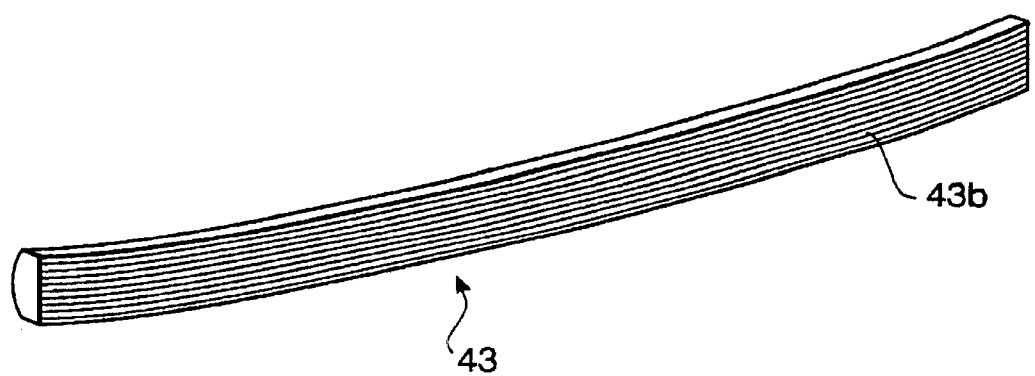
FIG. 12 is a perspective view of a lens, on which a diffractive lens structure is formed, included in an fθ lens of the scanning optical system.

FIG. 12 is a perspective view of the third lens 43 formed with the prismatic diffractive lens structure. In the second embodiment, the prismatic diffractive lens structure is designed such that a pitch of the linearly extending patterns is 0.03183 mm. With this structure, shift of the scanning line in the auxiliary scanning direction caused by the diffractive lens structure 42a is compensated.

In the above described embodiments, the diffractive lens structures 22a and 42a function to compensate for the lateral chromatic aberration. It may be possible to configure the diffractive lens structure such that characteristics thereof varies so that aberration of the refractive lens structure due to change of temperature is cancelled. That is, when the temperature changes, the refractive index of the plastic lens changes, thereby aberration (e.g., spherical aberration) is generated and changed. Further, as the temperature changes, wavelength of the laser beam emitted by the light source (e.g., a laser diode) also changes. The diffractive lens structure may be configured such that characteristics of the diffractive lens structure varies depending on the wavelength so that aberrations caused by the change of the refractive index, which varies depending on the temperature, area cancelled.

As described above, according to the present invention, by arranging the diffractive lens structure such that the axis of the diffractive lens structure is shifted in the auxiliary scanning direction with respect to the optical axis of the scanning lens system, unnecessary diffraction light components are spatially separated from the necessary diffraction light component. Thus, it becomes easy to shield the unnecessary components from being incident on the surface to be scanned.

The present disclosure relates to the subject matter contained in Japanese Patent Application No. HEI 11-248464, filed on Sep. 2, 1999, which is expressly incorporated herein by reference in its entirety.

What is claimed is:

1. A scanning optical system, comprising:

a light source that emits a light beam;

a deflector that deflects the light beam emitted by said light source to scan, in a main scanning direction, within a predetermined angular range;

a scanning lens system that converges the light beam deflected by said deflector on a surface to be scanned;

said scanning lens system having positive power, said scanning lens system having a plurality of lens surfaces, a diffractive lens structure being formed on at least one of said plurality of lens surfaces, said diffractive lens structure compensating for aberration in the main scanning direction caused by characteristics of a refractive lens structure of said scanning optical system, an axis that connects a front focal point and a rear focal point of said diffractive lens structure being shifted in an auxiliary scanning direction that is perpendicular to the main scanning direction with respect to an optical axis of the refractive lens structure of said scanning lens system.

2. The scanning optical system according to claim 1, wherein said diffractive lens structure is formed as a part of a rotationally symmetrical pattern including a plurality of concentric annular zones.

3. The scanning optical system according to claim 1, wherein said plurality of lens surfaces include a planar lens surface, said diffractive lens structure being formed on said planar lens surface.

4. The scanning optical system according to claim 1, including a light shielding member for shielding predetermined diffractive light components, said light shielding member being located between a lens provided with said diffractive lens structure and the surface to be scanned.

5. The scanning optical system according to claim 1, further provided with a prismatic diffractive lens structure for compensating shift of a scanning line, on the surface to be scanned, in the auxiliary scanning direction due to variation of wavelength of the beam.

6. The scanning optical system according to claim 5, wherein said prismatic diffractive lens structure is provided between said light source and said deflector.

7. The scanning optical system according to claim 5, wherein said prismatic diffractive lens structure is provided between said deflector and the surface to be scanned.

8. The scanning optical system according to claim 1, wherein the aberration compensated by said diffractive lens structure includes lateral chromatic aberration of said scanning lens system.

* * * * *